(12) United States Patent
Guo et al.

(10) Patent No.: US 10,951,587 B2
(45) Date of Patent: Mar. 16, 2021

(54) SYSTEM AND METHOD FOR WIRELESS NETWORK SECURITY

(71) Applicant: Alibaba Group Holding Limited, George Town (KY)

(72) Inventors: Zhenlong Guo, Hangzhou (CN); Lei Zhao, Hangzhou (CN)

(73) Assignee: Alibaba Group Holding Limited

( * ) Notice: Subject to any disclaimer, the term of this patent is extended or adjusted under 35 U.S.C. 154(b) by 68 days.

(21) Appl. No.: 15/676,811

(22) Filed: Aug. 14, 2017

(65) Prior Publication Data
US 2018/0054737 A1    Feb. 22, 2018

(30) Foreign Application Priority Data

Aug. 18, 2016   (CN) .......................... 201610688098.3

(51) Int. Cl.
*H04L 29/06* (2006.01)
*H04W 12/08* (2009.01)
*H04L 29/08* (2006.01)
*H04W 12/12* (2021.01)

(52) U.S. Cl.
CPC ........ *H04L 63/0272* (2013.01); *H04L 63/101* (2013.01); *H04L 63/1441* (2013.01); *H04L 67/141* (2013.01); *H04W 12/0804* (2019.01); *H04W 12/1204* (2019.01)

(58) Field of Classification Search
CPC .............. H04L 67/141; H04L 63/1441; H04L 63/0272; H04L 63/101; H04W 12/08; H04W 12/12
See application file for complete search history.

(56) References Cited

U.S. PATENT DOCUMENTS

| 7,327,258 | B2 | 2/2008 | Fast | |
|---|---|---|---|---|
| 7,801,058 | B2 | 9/2010 | Wang | |
| 2009/0122990 | A1* | 5/2009 | Gundavelli | H04L 12/4641 380/278 |
| 2010/0154044 | A1* | 6/2010 | Manku | H04L 67/327 726/7 |
| 2010/0161960 | A1 | 6/2010 | Sadasivan | |
| 2012/0190325 | A1 | 7/2012 | Abu-Hakima | |
| 2014/0096230 | A1 | 4/2014 | Wade | |
| 2014/0150083 | A1* | 5/2014 | Dinha | H04L 63/0272 726/15 |
| 2014/0344889 | A1 | 11/2014 | Lee | |
| 2015/0052595 | A1 | 2/2015 | Murphy | |

(Continued)

FOREIGN PATENT DOCUMENTS

| CN | 104008482 | 8/2014 |
|---|---|---|
| CN | 105338524 | 2/2016 |

(Continued)

*Primary Examiner* — Baotran N To
(74) *Attorney, Agent, or Firm* — Van Pelt, Yi & James LLP

(57) ABSTRACT

A wireless network connection security method is disclosed, including: acquiring a type of a wireless network to which a mobile device is connected; determining that the type of the wireless network is insecure; monitoring an application, the application being installed on the mobile device; determining that the application is to be activated; and in response to the determination that the application is to be activated, establishing a secure communication channel between the mobile device and a first server.

23 Claims, 13 Drawing Sheets

(56) References Cited

U.S. PATENT DOCUMENTS

| | | | |
|---|---|---|---|
| 2015/0052599 A1* | 2/2015 | Champagne | H04L 63/0272 |
| | | | 726/12 |
| 2015/0188889 A1 | 7/2015 | Lawson | |
| 2015/0188949 A1* | 7/2015 | Mahaffey | H04L 63/20 |
| | | | 726/1 |
| 2015/0365381 A1 | 12/2015 | Durbin | |
| 2015/0381654 A1 | 12/2015 | Wang | |

FOREIGN PATENT DOCUMENTS

| | | |
|---|---|---|
| WO | 2015102960 | 7/2015 |
| WO | 2015131949 | 9/2015 |
| WO | 2015188718 | 12/2015 |

\* cited by examiner

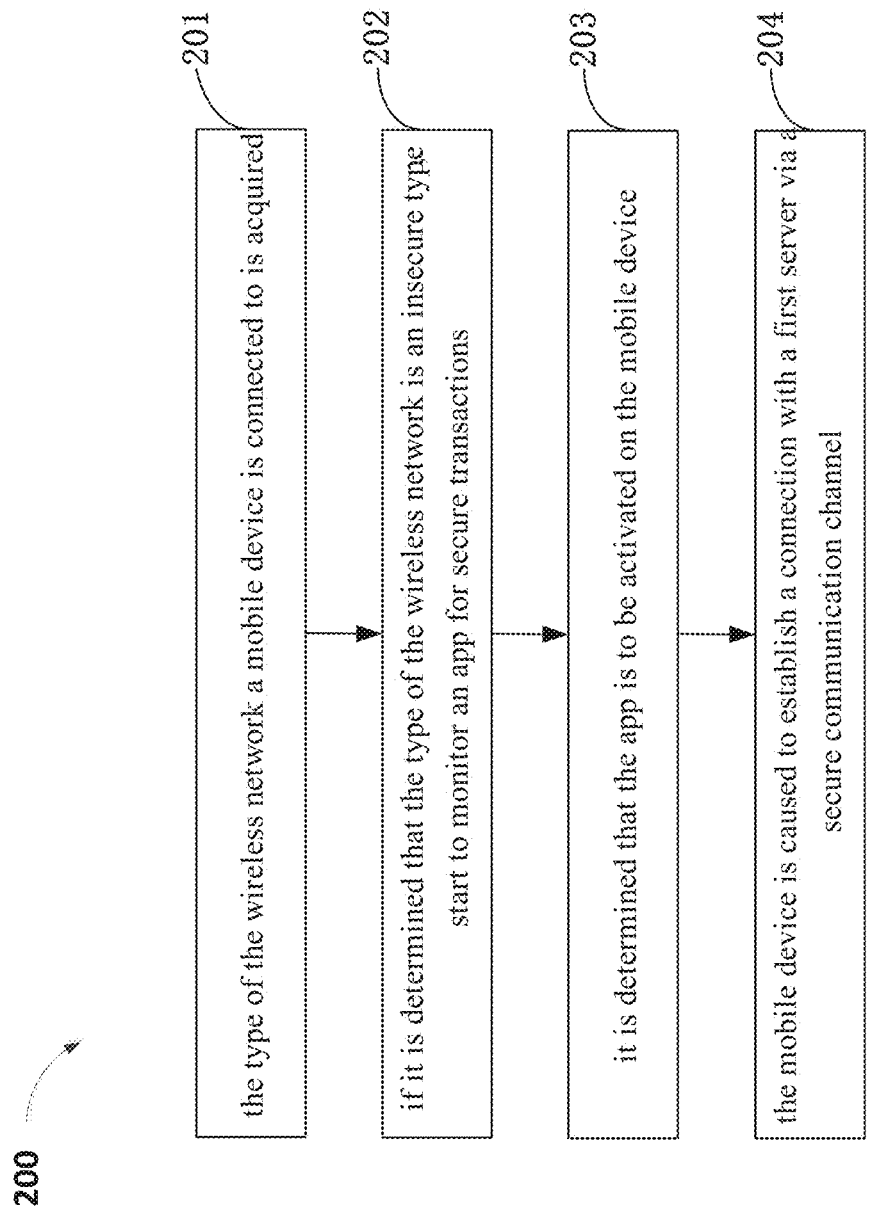

SYSTEM AND METHOD FOR WIRELESS NETWORK SECURITY

CROSS REFERENCE TO OTHER APPLICATIONS

This application claims priority to People's Republic of China Patent Application No. 201610688098.3 entitled A WIFI SECURITY SYSTEM AND A METHOD, A MEANS, AND AN ELECTRONIC DEVICE FOR WIRELESS NETWORK SECURITY, filed Aug. 18, 2016 which is incorporated herein by reference for all purposes.

FIELD OF THE INVENTION

The present application generally relates to network security technology and more particularly, to security systems and methods for wireless network security.

BACKGROUND OF THE INVENTION

When a mobile device such as a smart phone or a tablet or a laptop computer connects to a public Wireless-Fidelity (Wi-Fi) network at a public place (e.g., a mall, restaurant, movie theater, KTV, bar, airport, hotel, subway, etc.), a large number of users unknown to each other transmit data traffic over the shared Wi-Fi network. For example, a legitimate user connects to the public Wi-Fi network via his or her mobile device and decides to perform a security sensitive transaction such as making a payment on the mobile device. Because of the open nature of the public Wi-Fi, the payment transaction is vulnerable for being eavesdropped or snooped by a malicious user who is also connected to the public Wi-Fi, resulting in the sensitive information such as the legitimate user's password, account number, or the like being stolen by the malicious user.

Therefore, there exists a need for wireless network security over an insecure wireless network such as a public Wi-Fi network.

BRIEF DESCRIPTION OF THE DRAWINGS

Various embodiments of the invention are disclosed in the following detailed description and the accompanying drawings.

FIG. 2A is a flowchart of an example process for secure wireless network connections, in accordance with one or more embodiments of the present disclosure.

DETAILED DESCRIPTION

Figure 1:
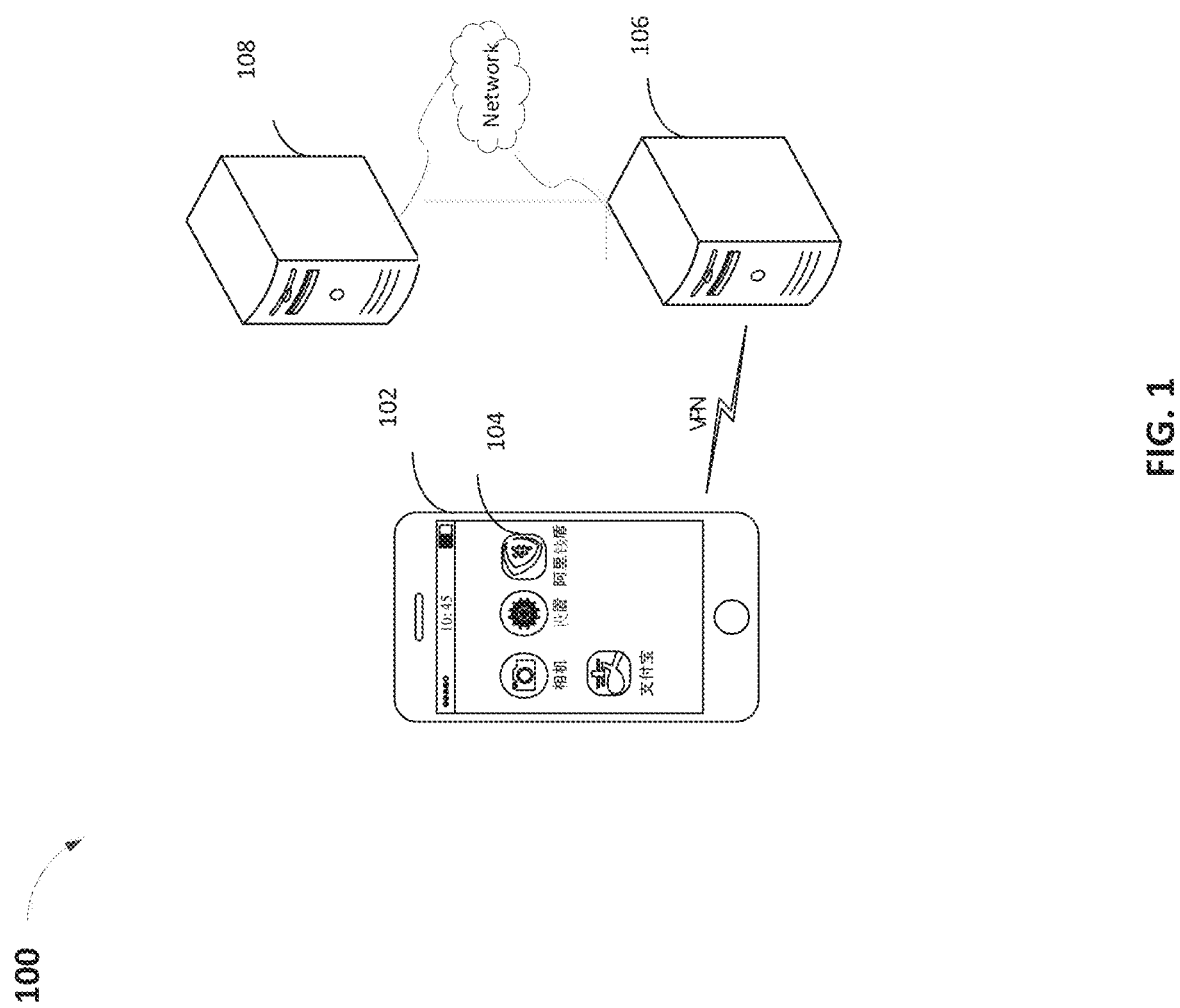
FIG. 1 is a block diagram of an example secure wireless network system, in accordance with one or more embodiments of the present disclosure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The exemplary embodiments will be explained in detail here. Examples thereof are presented in the drawings. In cases where the following descriptions relate to figures, the same numbers in different figures represent the same or similar elements, unless otherwise indicated. The implementations described in the exemplary embodiments below do not represent all of the implementations consistent with the present application. On the contrary, they are merely examples of means and methods consistent with some aspects of the present application, as described in detail in the claims.

The terms used in the present application merely serve to describe specific embodiments and are not intended to restrict the present application. The singular forms of "a," "said," and "the" used in the present application and the attached claims are also intended to include plural forms, unless otherwise clearly indicated by the context. Also, please understand that the term "and/or" used in this document refers to and contains any or all possible combinations of one or more associated elements.

Please understand that although the present application employs the terms "first," "second," "third," and so on to describe various information, this information shall not be limited by these terms. These terms merely serve to differentiate pieces of information of the same category. For example, so long as they remain within the scope of the present application, a first piece of information could be called a second piece of information. Similarly, a second piece of information could be called a first piece of information. The term "if" that is used herein may be interpreted as "when" or "upon being confirmed," depending on the context.

The term "client" as used herein refers to a program that interacts with its corresponding server in order to provide a service to a user of the client.

The term "app" as used herein refers to an application installed on a mobile device such as a smart phone, a tablet, a wearable device, or the like.

The term "virtual private network" or "VPN" as used herein refers to a private network constructed using public network connections (e.g., wired or wireless connections) to provide encrypted and secure communication between two points on the network.

FIG. 1 illustrates a block diagram of an example wireless network security system in accordance with an embodiment of the present disclosure. As shown herein, system 100 comprises a mobile device 102, a first server 106, and a second server 108. A client 104 is installed on mobile device 102, and capable of establishing a secure communication channel with first server 106. Second server 108 is configured to service one or more applications (apps) running on mobile device 102. Second server 108 is also in communication with first server 106. Such apps include, for example, security sensitive apps that a user of mobile device 102 operates. It should be noted that although one mobile device 102, one first server 106, and one second server 108 are shown in FIG. 1 for the purpose of illustration, embodiments of the present disclosure can be applied to a plurality of mobile devices, first servers, and second servers, and the like.

Mobile device 102 can be a computing device, such as a smart phone, tablet computer, personal computer, laptop, personal digital assistant (PDA), wearable device, or the like with one or more wired, wireless, or any other suitable communication connections to first server 106.

In this example, mobile device 102 is configured to directly access an IP Network through a Wi-Fi (802.11) connection. Once connected to the IP Network, mobile device 102 connects and communicates with one or more entities, e.g., first server 106 and second server 108, which are also in communication with the IP network. For example, the user of mobile device 102 can connect with an e-commerce service hosted at second server 108 to conduct online shopping, or with a video service hosted at second server 108 to stream movie-clips.

With network connectivity, mobile device 102 is configured to, via a variety of apps, interact with entities for security sensitive operations or transactions such as managing accounts, making payments, or a variety of other tasks that involve accessing, updating, and transmitting user sensitive information. For example, the user may make a payment online with a merchant and share credit card information with the merchant. The user may manage their online credit card accounts with the credit card issuer. The user may also connect to a financial institution through their mobile device 102, for managing bank accounts.

User sensitive information includes, for example, personal information (e.g., birth dates, social security numbers, etc.) and personal account information (e.g., credit card numbers, account numbers, passwords, etc.), for secure transactions such as accessing bank accounts or making payments. Mobile apps making use of such user sensitive information are referred to herein as security sensitive apps. In this example, Alipay™ is the security sensitive app.

After mobile device 102 is connected to a wireless network, client 104 is configured to determine whether the network type of the existing wireless network is an insecure type or a secure type. When client 104 detects the existing wireless network as, for example, a public Wi-Fi, a password free Wi-Fi, a free-of-charge Wi-Fi, a Wi-Fi unknown to mobile device 102, a Wi-Fi not frequently accessed by mobile device 102, or the like, client 104 determines that mobile device 102 is connected to an insecure type of network. On the other hand, if client 104 detects the existing wireless network as a password protected Wi-Fi or a Wi-Fi frequently accessed by mobile device 102, client 104 determines that mobile device 102 is on a secure type of network. Upon determining that the existing wireless network mobile device 102 is connected to an insecure type of network, client 104 causes mobile device 102 to enter into a secure mode. In this secure mode, client 104 monitors to detect whether a security sensitive app, e.g., a financial transaction app, is to be activated or launched on mobile device 102 by the user. When client 104 detects that a security sensitive app is to be activated, client 104 causes mobile device 102 to establish a secure communication channel with first server 106. In this example, the secure communication channel is a VPN connection and client 104 causes mobile device 102 to establish a VPN connection by launching a VPN application.

Once the security sensitive app is activated, client 104 is configured to monitor the operations or transactions of the security sensitive app, and to cause messages generated by the security sensitive app to be transmitted to first server 106 using the secure communication channel. First server 106 is configured to receive via the secure communication channel messages generated by the security sensitive app and to forward the messages to second server 108 for processing. In this example, the message generated by the security sensitive app, e.g., Alipay™, can be an account transfer related message, a payment message, an order message, or the like.

In some embodiments, during the secure mode, client 104 is further configured to detect whether the current display interface of mobile device 102 is displaying the user interface of the security sensitive app. The detection can be performed by invoking an operating system call such as registering a listener to be notified once the system display's visibility changes for one or more particular user interface components. When the current display interface is not displaying the interface of the security sensitive app, client 104 causes mobile device 102 to disconnect from the secured communication channel but to maintain a connection with first server 106 via the existing insecure wireless network.

In this example, when it is determined that the type of the current wireless connection, e.g., a Wi-Fi connection, is insecure, client 104 enters into a secure mode. When a security sensitive app, e.g., Alipay™, is activated on mobile device 102 with client 104 in the secure mode, client 104 establishes a secure communication channel, e.g., a VPN connection, with first server 106. In this example, client 104 is the Ali Money Shield™ app and client 104 can be configured upon installation to allow a user to select mobile apps for Ali Money Shield™ to provide for security. With user configured inter-app communication permissions, client 104 can be authorized to access transactions and statuses of the apps selected. In this example, it is ensured that client 104 starts monitoring the operations of Alipay™ and forwarding messages generated by the operations of Alipay™ via the secure communication channel to first server 106. This prevents a malicious user from stealing sensitive information such as a legitimate user's password to Alipay™ when the legitimate user operates Alipay™ to transmit sensitive information on a public network. Therefore, secure transactions on mobile device 102 are ensured even though the user accesses a risky network, e.g., a public Wi-Fi network, on mobile device 102. The secure communication channel (e.g., VPN) connection is established only when the security sensitive app is activated so that client 104 would not generate excessive system loads on first server 106 by maintaining a long-term connection. Furthermore, secured communication transmitted to and from first server 106 can also be reduced to preserve system resources.

Figure 2B:
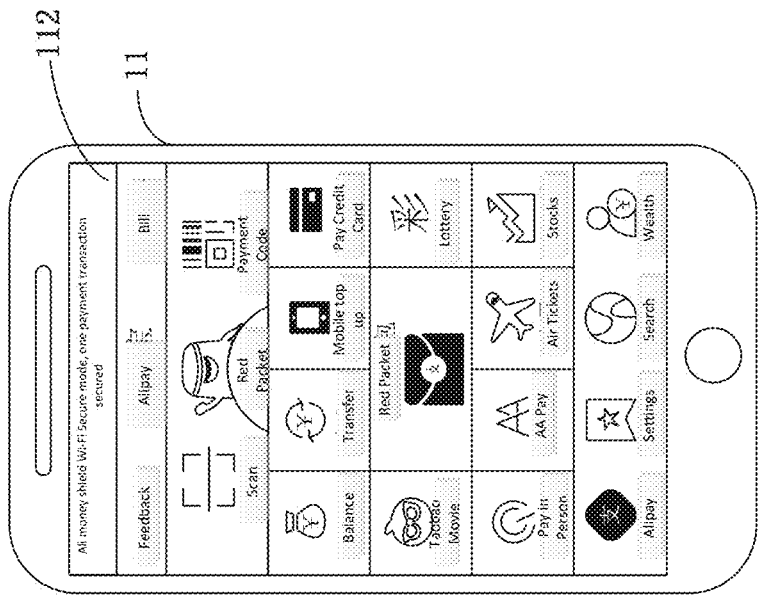
FIG. 2B is a schematic illustration of a screen shot of an example scenario of the process of FIG. 2A in operation, in accordance with one or more embodiments of the present disclosure.

FIG. 2A is a flowchart of an example process for secure wireless network connections in accordance with an embodiment of the present disclosure. FIG. 2B is a schematic illustration of a screen shot of an example scenario of process 200 of FIG. 2A in operation in accordance with an embodiment of the present disclosure. Process 200 can be implemented by, for example but is not limited to, client 104 on mobile device 102 of FIG. 1.

As shown herein, process 200 starts at 201, where the type of wireless network a mobile device is connected to is acquired.

In this example, a mobile device is currently connected to a Wi-Fi network. The types of a Wi-Fi network include, for example, a free-of-charge Wi-Fi network, a password-free Wi-Fi network, a Wi-Fi network not frequently visited by the mobile device, a Wi-Fi network unknown to the mobile device, or the like. The above-described types of Wi-Fi are considered insecure types of Wi-Fi connections. For another example, a password-protected Wi-Fi or a Wi-Fi frequently accessed by the user of the mobile device is considered a secure type of Wi-Fi. Types of the wireless network can be configured according to various usages or demands of networks without limitations.

At 202, if it is determined that the type of the wireless network is an insecure type, process 200 starts to monitor an app for secure transactions. In this example, the application is a pre-configured security sensitive app, such as the payment app of Alipay™. It should be noted that any types of apps, not limited to security sensitive ones, can be monitored by process 200, or pre-configured for secure transaction and to be monitored by process 200. In some embodiments, the monitored aspects of an app include, for example, whether the app is to be activated, whether the app has exited from operation, operations or transactions performed by the user using the app, etc.

At 203, it is determined that the app is to be activated on the mobile device. For example, the client can be implemented to query a list of active processes of the mobile device and to determine whether the app is a foreground process. For another example, the client can be implemented to register for a listener on the event of the app being launched. For yet another example, the app can be configured to notify the client upon being launched into activation.

At 204, the mobile device is caused to establish a connection with a first server via a secure communication channel such as a virtual private network (VPN).

In this example, the VPN connection is a network designated for connecting the mobile device and the first server. Messages generated and output by the pre-configured app on the mobile device are transmitted over the VPN connection to the first server, which in turn forwards these messages to a second server for processing.

In this example, the client is Ali Money Shield™, an official software for online shopping security on cellular devices. The first server is configured to service Ali Money Shield™. The mobile device connects to a wireless local area network via a public Wi-Fi provided by a public place, e.g., a mall. When Ali Money Shield™ determines that the type of the current Wi-Fi connection is a free-of-charge Wi-Fi and therefore the mobile device is currently on an insecure network, Ali Money Shield™ enters into the secure mode. While in the secure mode, Ali Money Shield™ monitors one or more apps pre-configured for secure transaction. Here, Ali Money Shield™ monitors to detect whether a financial transaction app, such as Alipay™, is to be activated on the mobile device by the user.

As shown in FIG. 2B, mobile device 11 has Alipay™ activated and is currently displaying the user interface of Alipay™. At this point of time, Ali Money Shield™ has determined that Alipay™ is activated and causes mobile device 11 to display an indication that Ali Money Shield™ is in secure mode. The indication can be displayed in any suitable manner at any suitable location on the current display interface of mobile device 11, for example, in status bar 112 where other information such as the time, cellular carrier, network status, battery level, etc. are usually displayed. As shown herein, with Ali Money Shield™ in secure mode and Alipay™ active, status bar 112 displays that "Ali money shield Wi-Fi Secure mode, one payment transaction secured." Here, Ali Money Shield™ causes mobile device 11 to establish a secure communication channel (e.g., a VPN) with the first server so that messages generated by Alipay™ are encrypted by the secure communication channel and transmitted over the secure communication channel to the first server. Upon receiving the messages from mobile device 11, the first server decrypts the messages and forwards them to the second server to be processed.

The client can be configured to monitor any aspects or operations of an app for secure transaction on the mobile device in order to ensure the security of information transmitted by the app over certain types of wireless networks (e.g., insecure wireless networks). Since the secure communication channel is established only when a app is to be activated, the mobile device does not require long-term connections and incurs less system load on the first server. In this manner, traffic to and from the first server over the secure communication channel is also reduced.

Figure 3A:
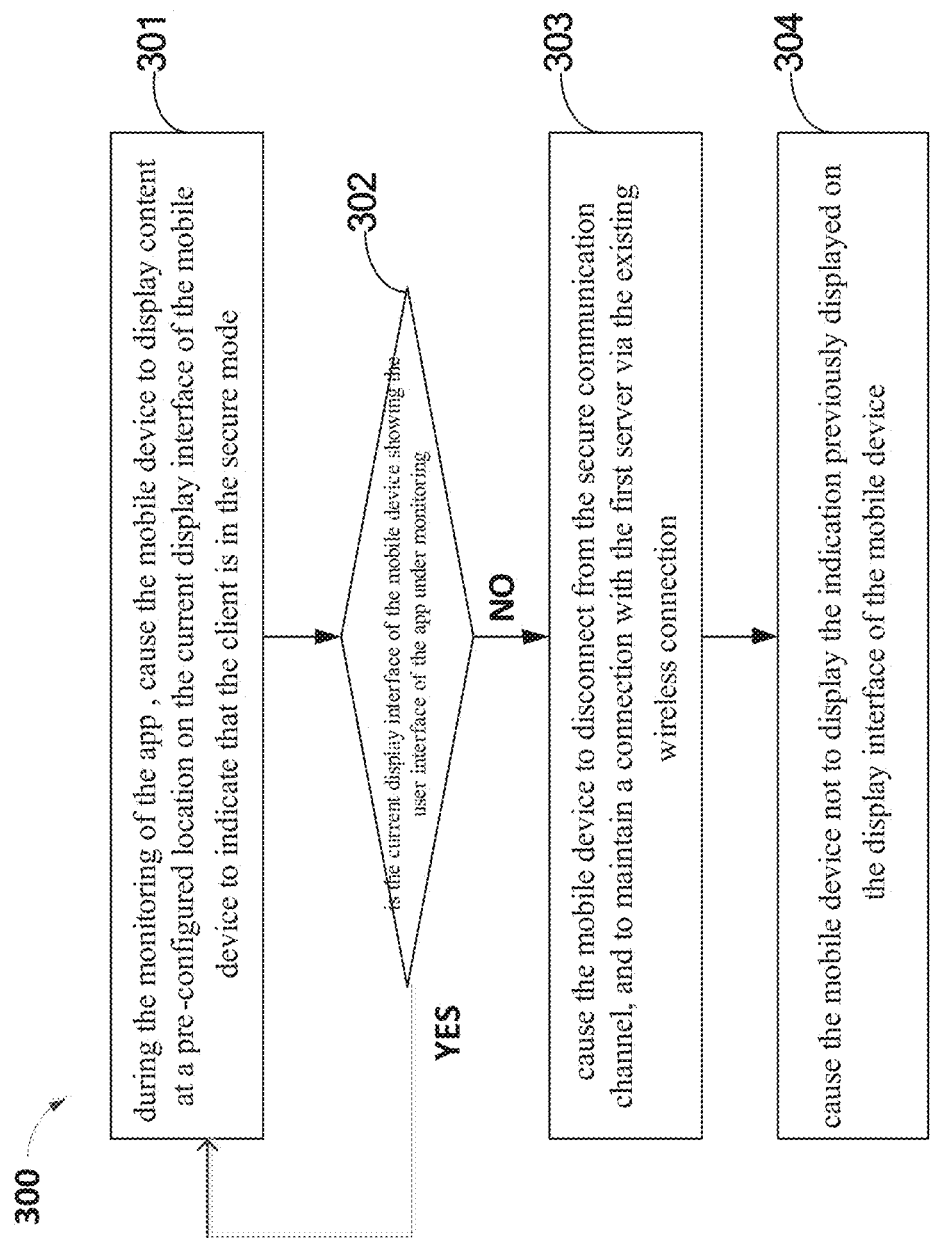
FIG. 3A is a flowchart of an example process for secure wireless network connections, in accordance with one or more embodiments of the present disclosure.
Figure 3B:
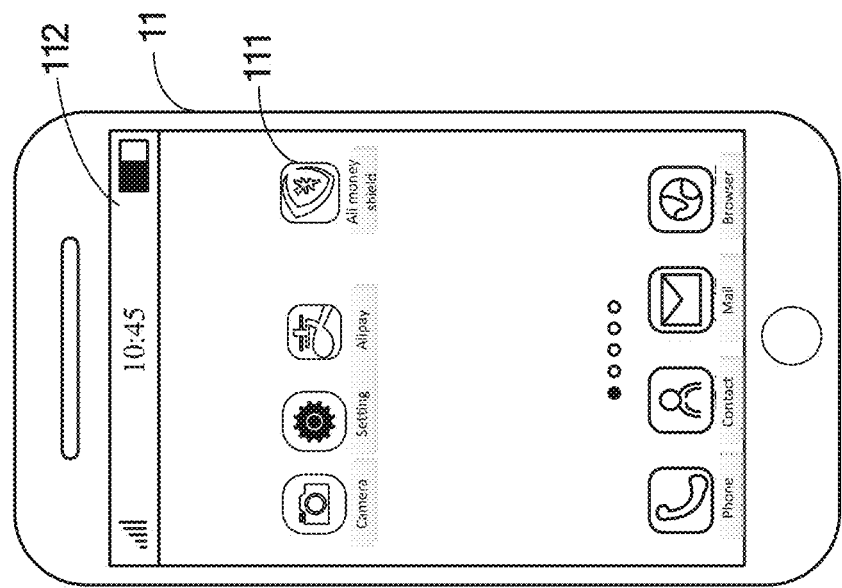
FIG. 3B is an illustration of a screen shot of an example scenario of the process of FIG. 3A in operation, in accordance with one or more embodiments of the present disclosure.

FIG. 3A is a flowchart of an example process for secure wireless network connections in accordance with an embodiment of the present disclosure. FIG. 3B illustrates a screen shot of an example scenario of process 300 of FIG. 3A in operation in accordance with an embodiment of the present disclosure. Process 300 can be implemented by, for example, client 104 on mobile device 102 of FIG. 1, after process 200 of FIG. 2A causes mobile device 102 to establish a connection with first server 106 using a secure communication channel.

As shown herein, process 300 starts at 301, where, during the above described monitoring of the app, the mobile device displays content at a pre-configured location on the current display interface of the mobile device to indicate that the client is in the secure mode. As shown above in FIG. 2B, status bar 112 of the mobile device is configured to display indications of the mode and statuses of the client. In this example the app is an app pre-configured to be monitored.

Referring back to FIG. 3A, at 302, it is detected whether the current display interface of the mobile device is showing the user interface of the app under monitoring. When the current display interface does not display the user interface of the app, process proceeds to 303. When the current display interface is displaying the user interface of the app, process 300 goes back to 301 and continues to monitor the pre-configured app.

In this example, the client determines whether the current display interface of the mobile device is displaying the Alipay™ user interface by querying the operating system of the mobile device using certain pre-defined function calls supported by the operating system (e.g., by invoking a getVisibility function call or the like). In this example, as shown in FIG. 3B, the current display interface of mobile device 11 displays the home screen of the operating system instead of the user interface of Alipay™. Thus, it is determined that Alipay™ is no longer shown on the current display interface.

At 303, when the current display interface does not show the user interface of the app, process 300 causes the mobile device to disconnect from the secure communication channel (e.g., the VPN), and to maintain the connection with the first server via the existing wireless connection, e.g., the Wi-Fi connection.

In this example, when Alipay™ is no longer displayed on the current display interface of the mobile device, the absence of the display indicates that the client no longer needs to be in the secure mode. Or, it indicates that the client, if still in the secure mode, no longer needs to monitor the activities or operations of Alipay™. Thus, the client disconnects from the secure communication channel (e.g., by invoking a CloseVPNConnection function call or the like) but continues to maintain the connection with the first server via the existing Wi-Fi connection. In this manner, it is ensured that the user can access other apps of lower security risks, such as video apps or game apps, through the existing (free) Wi-Fi connection to conserve the amount of network bandwidth used.

At 304, when the mobile device disconnects from the secure communication channel, process 300 causes the mobile device not to display the indication previously displayed on the display interface of the mobile device. As shown in FIG. 3B, when client 111 (e.g., Ali Money Shield™) causes the mobile device 11 to disconnect from the secure communication channel, or after mobile device 11 disconnects from the communication channel, status bar 112 no longer displays the information previously displayed with regard to the mode and statuses of client 111. As shown herein, status bar 112 now displays the usual information of the signal status bar, the time, and the battery level.

In this example, it is determined whether the current display interface shows an interface of the pre-configured app under the monitoring of the client. When the current display interface no longer shows the interface of the pre-configured app, the mobile device is caused to disconnect from the communication channel. In this way, the system load incurred by the client via the communication channel connection on the first server can be reduced. The mobile device no longer displays the client related messages and also helps to promptly inform the user of the current status of the client.

Figure 4A:
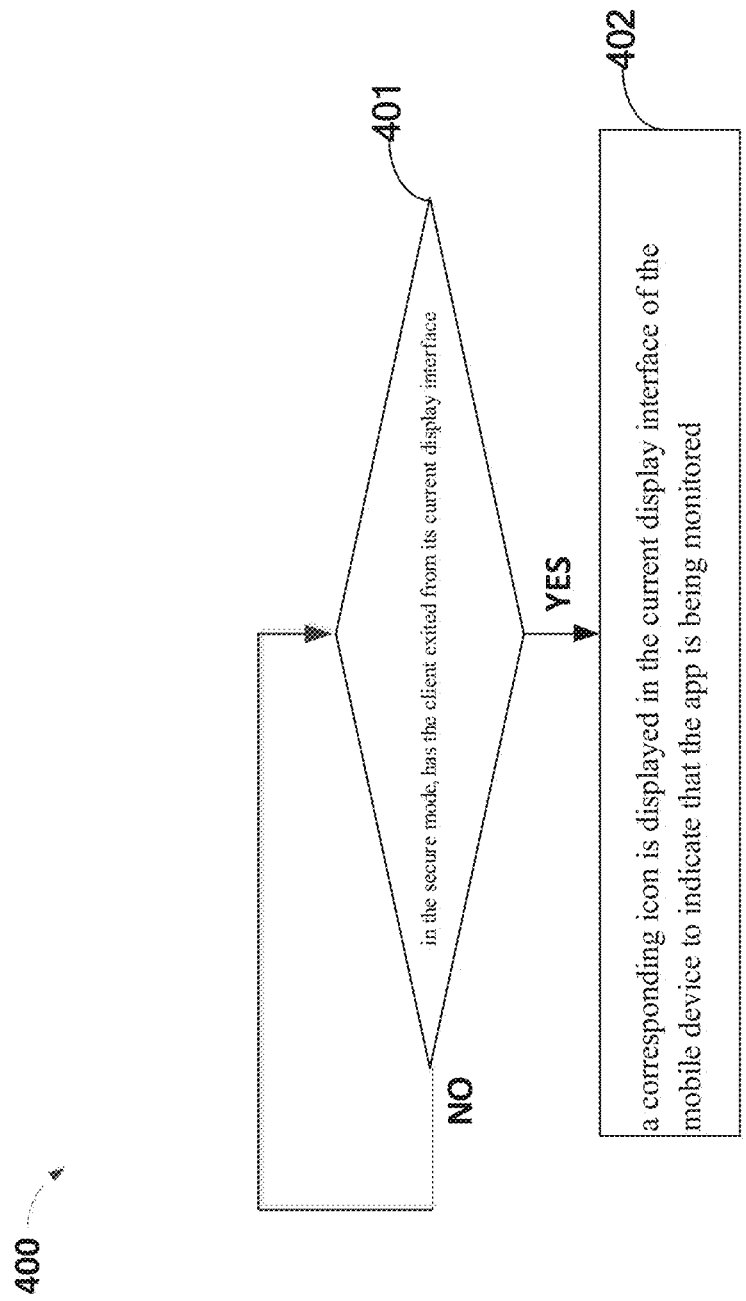
FIG. 4A is a flowchart of an example process for secure wireless network connections, in accordance with one or more embodiments of the present disclosure.
Figure 4B:
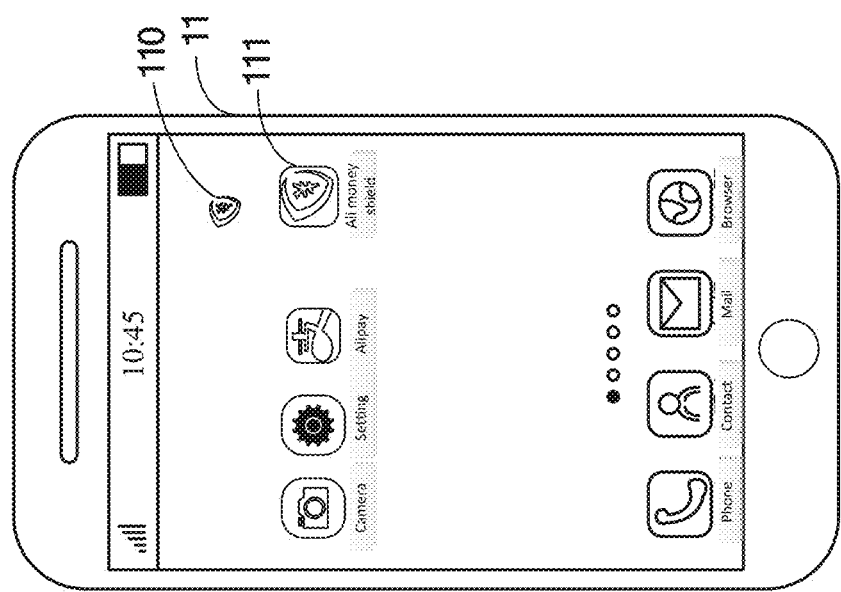
FIG. 4B is an illustration of a screen shot of an example scenario of the process of FIG. 4A in operation, in accordance with one or more embodiments of the present disclosure.
Figure 4C:
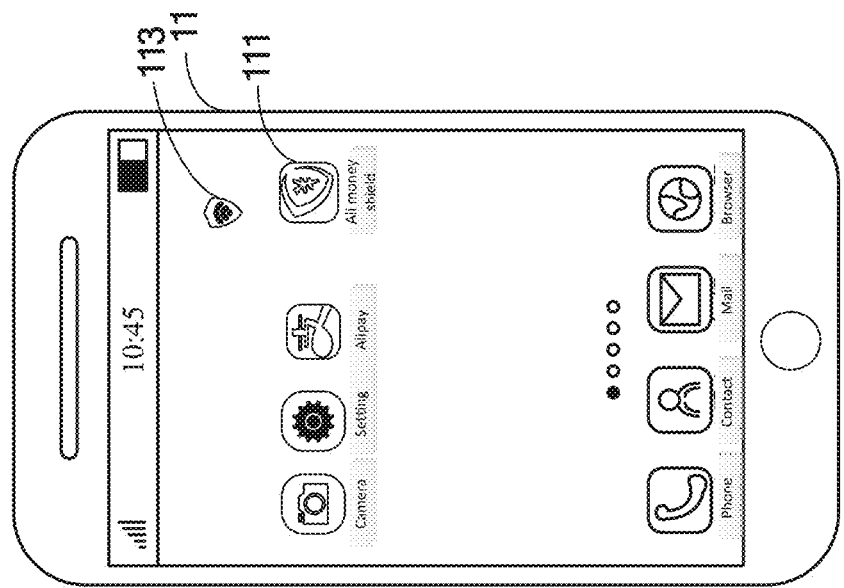
FIG. 4C is an illustration of another screen shot of another example scenario of the process of FIG. 4A in operation, in accordance with one or more embodiments of the present disclosure.

FIG. 4A is a flowchart of an example process for secure wireless network connections in accordance with an embodiment of the present disclosure. FIG. 4B illustrates a screen shot of an example scenario of process 400 of FIG. 4A in operation in accordance with an embodiment of the present disclosure. FIG. 4C illustrates a screen shot of another example scenario of process 400 of FIG. 4A in operation in accordance with an embodiment of the present disclosure. Process 400 can be implemented by, for example, client 104 on mobile device 102 of FIG. 1.

As shown in FIG. 4A, process 400 starts at 401, where in the secure mode, it is determined whether the client has exited (closed) from its display interface. When the client has exited from its display interface, process 400 proceeds to 402. When the client has not exited from its display interface, process 400 goes back to 401 to remain in the secure mode and to continue to monitor the apps.

At 402, when the client has exited from its interface, a corresponding icon is displayed in the current display interface of the mobile device to indicate that the app is being monitored.

In this example, as shown in FIG. 4B, when client 111 is not in the secure mode and has exited from its current display interface (e.g., as shown herein, the home screen is displayed instead), indicator 110 corresponding to client 111 is displayed in the current display interface of mobile device 11. The indicator can be any suitable interface components such as an icon, an animation, a toast, a bubble, a balloon, or the like. In some embodiments, the indicator is an icon having a shape similar or identical to that of the icon of client 111 on the user interface. In this example, indicator 110 is a smaller version of the same design (tilted shield) of the Ali Money Shield™ icon.

Also in this example, as shown in FIG. 4C, when client 111 is in the secure mode, and client 111 has exited from its current interface, a corresponding indicator is displayed to indicate that a pre-configured app is being monitored. Similarly, the indicator can be any suitable user interface component such as an icon, an animation, a toast, a bubble, a balloon, or the like. In this example, indicator 113 is an icon, as shown in FIG. 4C, which indicates the pre-configured app is being monitored. In some embodiments, indicator 110 of FIG. 4B and indicator 113 of FIG. 4C are floating icons. Upon the detection of the user clicking on and moving indicator 110 or indicator 113, indicator 110 or indicator 113 may be moved to any location on the current display interface by the user using finger movements. Further, by interacting with indicators 110 or 113, the user can obtain the status information of client 111 with respect to its secure mode and statuses. For example, the user can rotate indicator 110 or indicator 113 to display a textual popup indicating that "Ali Money Shield™ in secure mode" for two seconds to obtain more detailed information about the application being monitored.

Figure 5A:
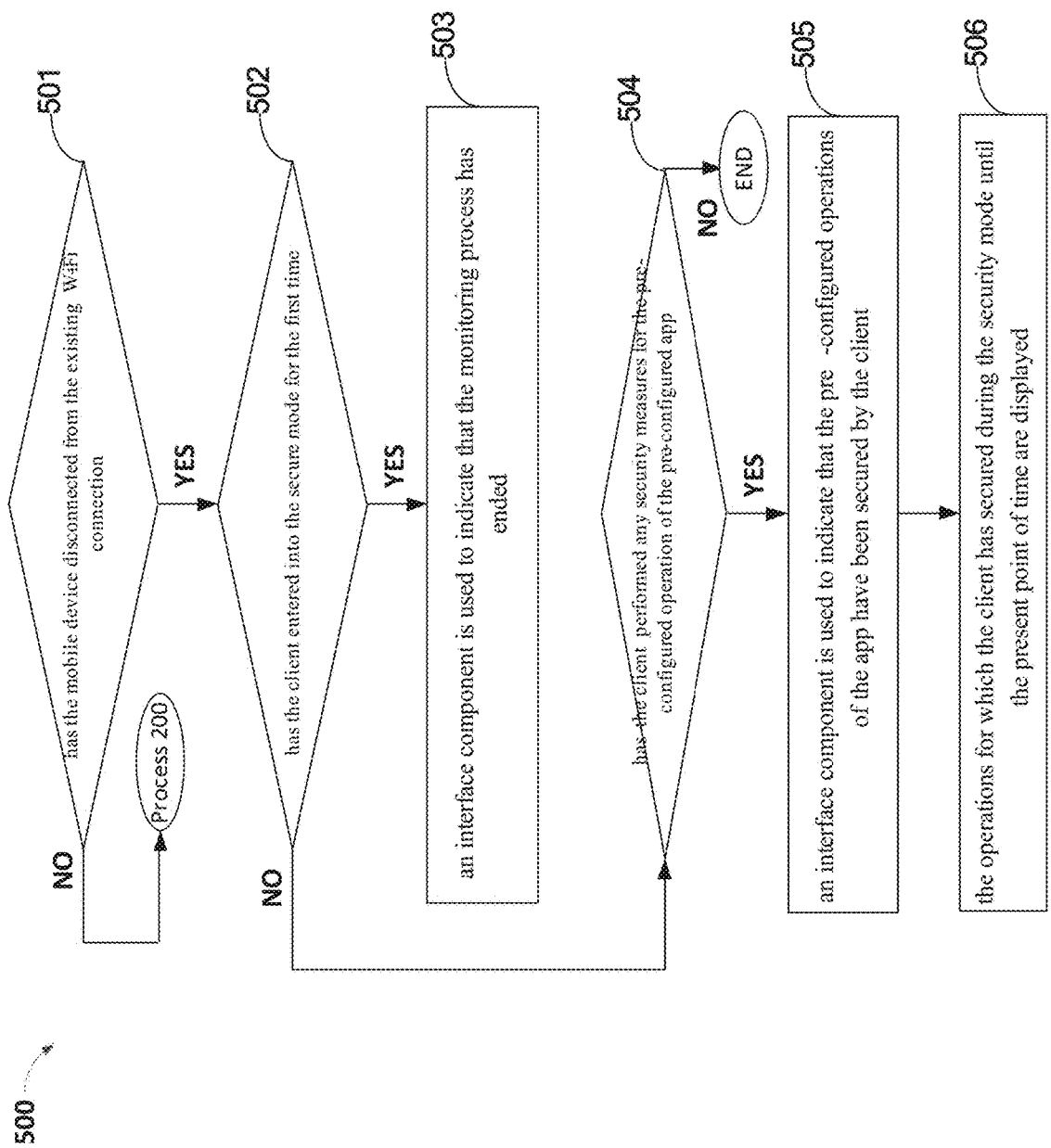
FIG. 5A is a flowchart of an example process for secure wireless network connections, in accordance with one or more embodiments of the present disclosure.
Figure 5B:
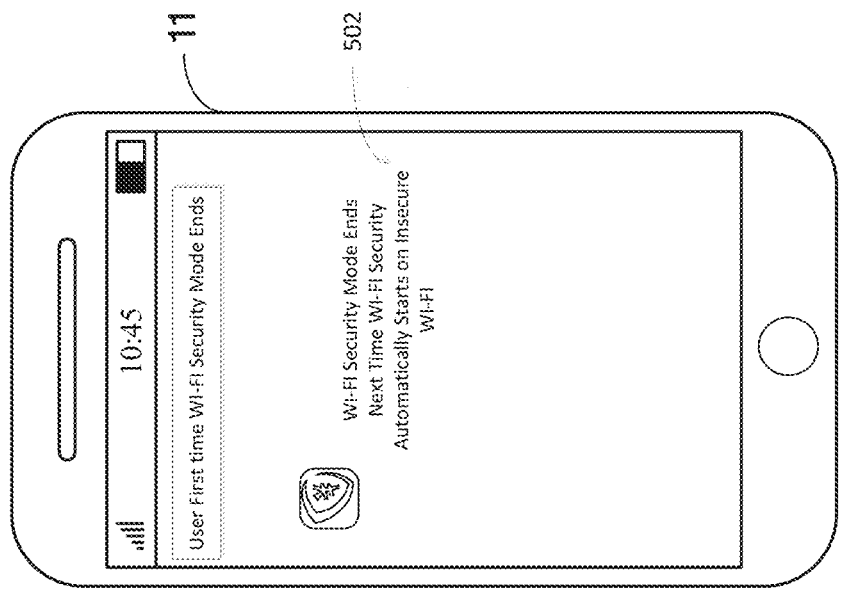
FIG. 5B is an illustration of a screen shot of an example scenario of the process of FIG. 5A in operation, in accordance with one or more embodiments of the present disclosure.
Figure 5C:
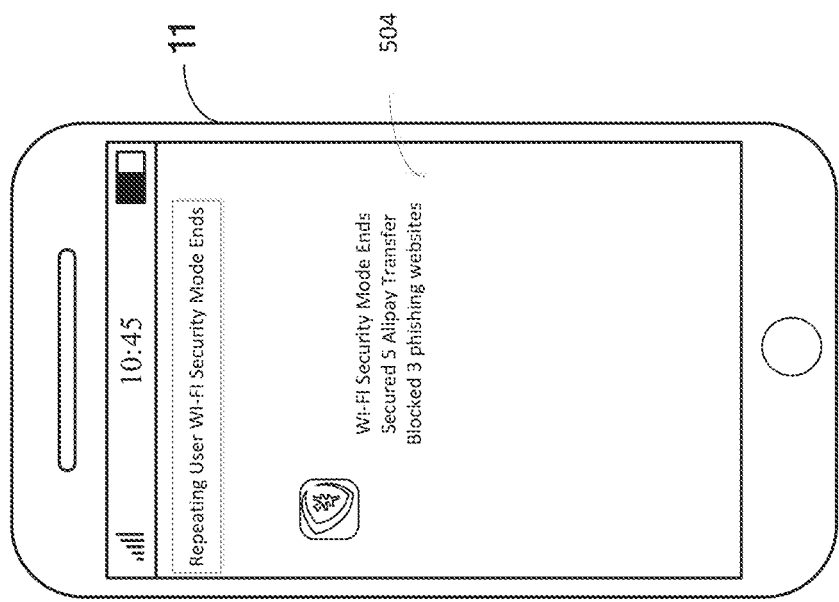
FIG. 5C is an illustration of another screen shot of another example scenario of the process of FIG. 5A in operation, in accordance with one or more embodiments of the present disclosure.

FIG. 5A is a flowchart of an example process for secure wireless network connections in accordance with an embodiment of the present disclosure. FIG. 5B illustrates a screen shot of an example scenario of process 500 of FIG. 5A in operation in accordance with an embodiment of the present disclosure. FIG. 5C illustrates a screen shot of another example scenario of process 500 of FIG. 5A in operation in accordance with an embodiment of the present disclosure. Process 500 can be implemented by, for example, client 104 on mobile device 102 of FIG. 1 and in connection with process 200 of FIG. 2A.

As shown in FIG. 5A, process 500 starts at 501 where it is determined whether the mobile device has disconnected from the existing Wi-Fi connection. When the mobile device has disconnected from the existing Wi-Fi connection, process 500 proceeds to 502. When the mobile device remains connected over the existing Wi-Fi connection, process 500 continues to execute process 200 of FIG. 2A.

In some embodiments, the client determines whether the mobile device connects to a Wi-Fi network by querying the network interface of the electronic device.

At 502, when the mobile device is disconnected from the Wi-Fi connection, it is determined whether the client has entered into the security mode for the first time. When the client has entered the secure mode for the first time, process 500 follows the YES path to proceed to 503. When it is not the first time that the client entered the secure mode, process 500 follows the NO path to proceed to 504.

At 503, when the client has entered the secure mode for the first time, an interface component is used to indicate that the monitoring process has ended. Process 500 concludes at 503. The interface component can be any suitable interface component. For example, it can be a toast, a pop up message window, or the like.

As shown in FIG. 5B, at 503, when the client has entered the secure mode for the first time, and mobile device 11 needs to leave the existing Wi-Fi connection, a toast 502 is displayed on the display interface of the mobile device. The toast is a window that appears on the display for a limited amount of time (e.g., a few seconds) then automatically disappears. Here, the toast indicates to the user that the secure mode has ended. In some embodiments, if the operating system of mobile device 11 grants the client permission to open a toast, a toast is displayed. In some other embodiments, if the operating system of mobile device 11 does not grant the client permission to open a toast, a popup message (e.g., a window that requires the user to manually close) is displayed.

Referring back to FIG. 5A, at 504, when it is not the first time the client has monitored the app, it is determined whether the client has performed any security measures for the pre-configured operation of the app. If so, process 500 proceeds to 505. If no, process 500 concludes at 504.

At 505, an interface component is used to indicate that the pre-configured operations of the app have been secured by the client. The interface component can be any suitable interface component. For example, it can be a toast or a popup message window, or the like.

A 506, the operations for which the client has secured during the secure mode until the present point of time are displayed. Process 500 concludes at 506. As shown in FIG. 5C, from 504 through 506, when the client has not entered the secure mode for the first time (e.g., the client has entered the security mode for a second time), if mobile device 11 needs to leave the existing Wi-Fi connection, it is determined whether any operations such as account transfer on Alipay™ have been secured by the client. For example, since Ali Money Shield™ is authorized to access the transaction log or details of operations of Alipay™ such as bank account transfers, placed orders or the like, Ali Money Shield™ retains the information about transactions secured for Alipay™ in the secure mode. As shown in FIG. 5C, a toast 504 is displayed to indicate that Ali Money Shield™ has protected five account transfers by Alipay™ and blocked three phishing websites. In some embodiments, if the operating system of mobile device 11 grants the client permission to open a toast, a toast is displayed. If the operating system of mobile device 11 does not grant the client permission to open a toast, a popup message is displayed.

In this example, when the client disconnects from the existing Wi-Fi connection, corresponding notification messages are displayed to the user according to whether the client has entered the secure mode before. Such messages help the user learn about the statuses and results the client has provided for the app.

Figure 6:
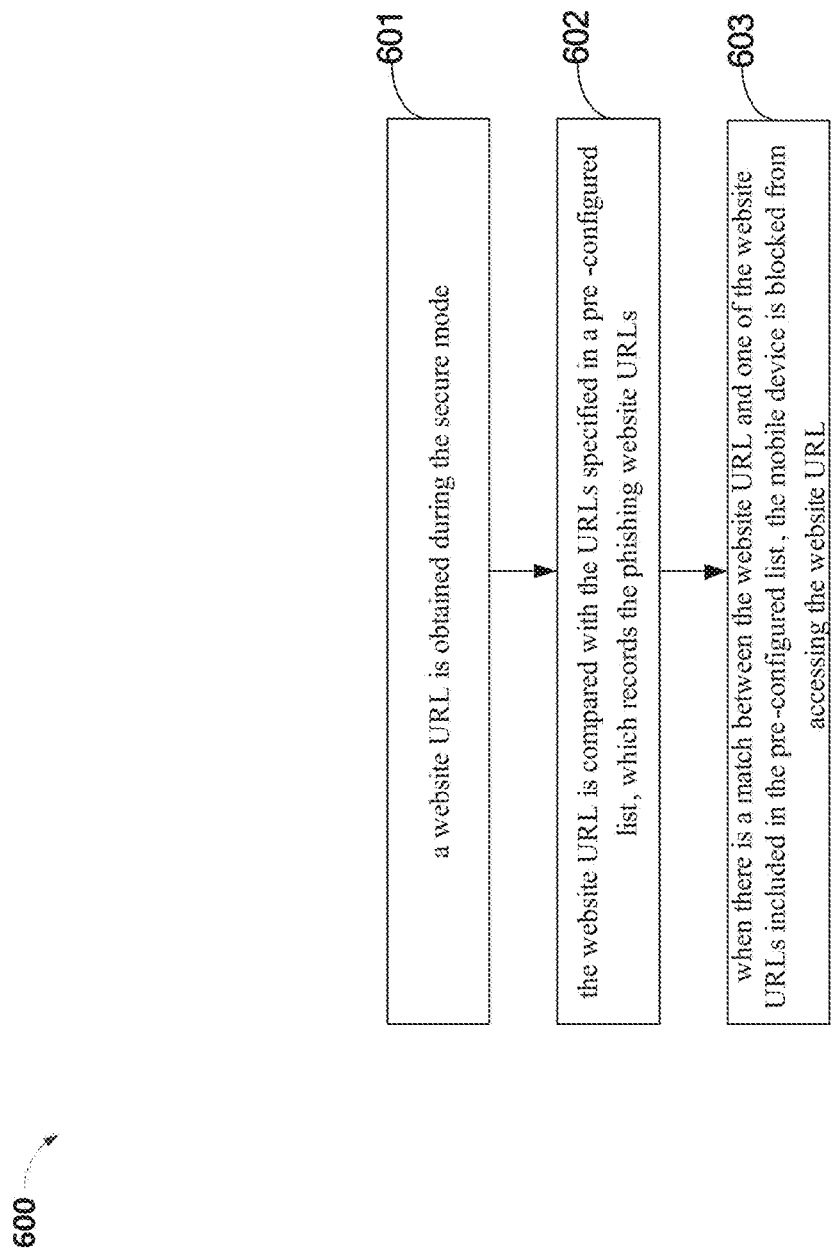
FIG. 6 is a flowchart of an example process for secure wireless network connections, in accordance with one or more embodiments of the present disclosure.

FIG. 6 is a flowchart of a process for secure wireless network connections in accordance with an embodiment of the present disclosure. Process 600 can be implemented by, for example, client 104 on mobile device 102 of FIG. 1.

As shown in FIG. 6, process 600 starts at 601 where a website URL is obtained during the secure mode.

In this example, the client obtains the website Uniform Resource Locator (URL) from the browser launched by the user on the mobile device.

At 602, the website URL is compared with the URLs specified in a pre-configured list, which records the phishing website URLs.

At 603, when there is a match between the website URL and one of the website URLs included in the pre-configured list, the mobile device is blocked from accessing the website URL.

In some embodiments, the pre-configured list is obtained from the first server, which compiles and maintains a collection of the URLs of the phishing websites. The first server also updates the pre-configured list periodically or in real time. The first server further transmits the pre-configured list to the mobile device so that the client can use the most updated pre-configured list to block phishing websites.

In some other embodiments, the client transmits the website URL obtained at 601 to the first server (e.g., first server 106 of FIG. 1). By checking against the above-described pre-configured list, the first server determines whether the website URL is included in the pre-configured list. If so, the first server generates a comparison result and transmits the comparison result back to the mobile device. When the client determines that the comparison result indicates that the website URL is included in the pre-configured list, the mobile device is blocked from accessing the website URL.

With phishing websites blocked during the secure mode of the client, the Wi-Fi connection is also protected against phishing websites automatically on the mobile device. This prevents the user of the mobile device from falling victim to a phishing website.

Figure 7:
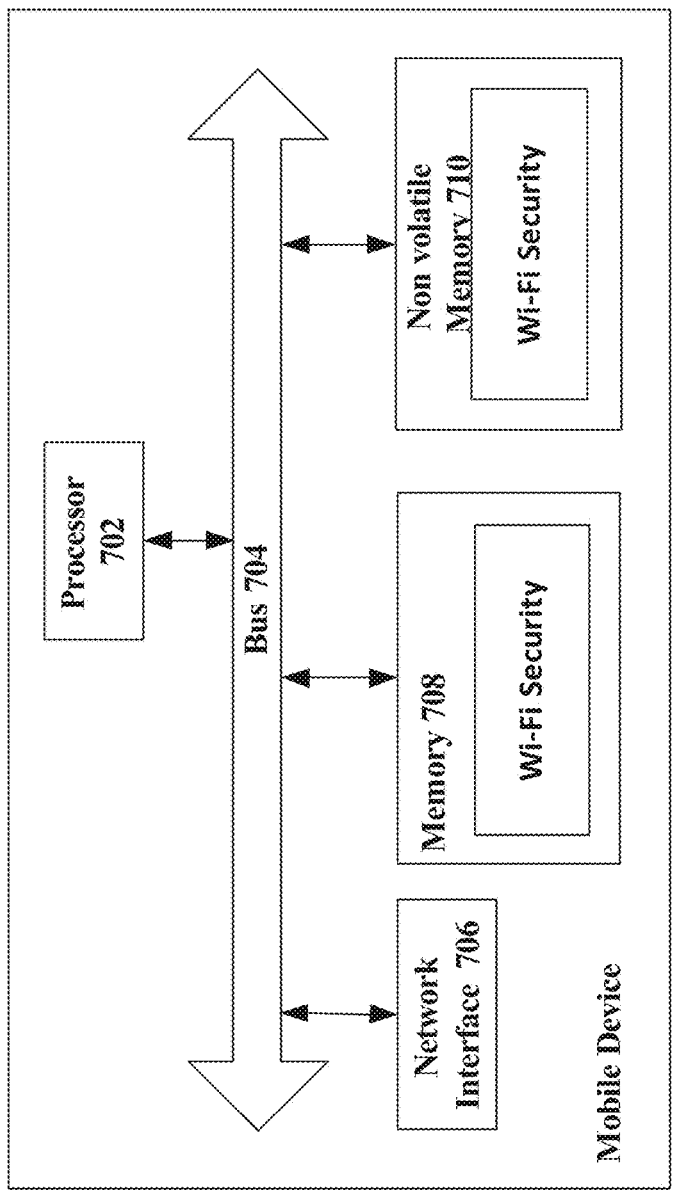
FIG. 7 is a functional diagram illustrating an embodiment of a programmed computer system for secure wireless network connections, in accordance with one or more embodiments of the present disclosure.

FIG. 7 is a functional diagram illustrating an embodiment of a programmed computer system for secure wireless network connections, in accordance with an embodiment of the present disclosure. Computing system 700 can be used to implement the mobile device, the first server, and the second server (shown in FIG. 1) as appropriate. As will be apparent, other computer system architectures and configurations can be used to implement the systems and methods for wireless network security. Computing system 700 includes a processor 702, a bus 704, a network interface 706, a memory 708, and a non-volatile memory 710. Processor 702 reads the corresponding computer program from the non-volatile memory 710 to the memory 708 for execution. The present disclosure does not exclude other implementations in addition to a software implementation, e.g., a logic device or a combination of software and hardware. In other words, the entity that executes the process is not be limited to the various logical units. It may also be hardware or a logic device.

Processor 702 is used for acquiring the type of wireless network accessed by the mobile device. The mobile device is controlled by process 702 so that it establishes a connection with a first server via a virtual private network (VPN) using network interface 706.

Upon considering the invention disclosed here in the description and in practice, persons skilled in the art shall easily think of other schemes for implementing the present application. The present application intends to cover any variation, use, or adaptation of the present application where the variation, use, or adaptation complies with the general principles of the present application and includes public knowledge or customary technical means in the art not disclosed by the present application. The description and embodiments are regarded merely as illustrative. The true scope and spirit of the present application are indicated by the claims below.

Please also note that the term "comprise" or "contain" or any of their variants are to be taken in their non-exclusive sense. Thus, processes, methods, merchandise, or equipment that comprises a series of elements not only comprises those elements, but also comprises other elements that have not been explicitly listed or elements that are intrinsic to such processes, methods, merchandise, or equipment. In the absence of further limitations, elements that are limited by the phrase "comprises a(n) . . . " do not exclude the existence of additional identical elements in processes, methods, merchandise, or devices that comprise said elements.

The above-described are merely preferred embodiments of the present application and do not serve to limit the present application. Any modifications, equivalent substitutions, or improvements that are performed shall be contained within the protective scope of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for secure wireless network connections by a client, comprising:
    acquiring, by the client on a mobile device, a type of a wireless network to which the mobile device is connected;
    determining, by the client, that the type of the wireless network corresponds to a network that is insecure based at least in part on a frequency with which the mobile device connects to the wireless network;
    in response to a determination that the type of the wireless network is insecure, invoking, by the client, a secure mode in which the client is to operate while the mobile device is connected to the wireless network that is insecure;
    in response to the secure mode being invoked, monitoring for activation of an application, the application being installed on the mobile device;
    determining that the application is to be activated while the mobile device is connected to the wireless network that is insecure;
    in response to a determination that the application is to be activated while the mobile device is connected to the wireless network that is insecure, establishing a secure communication channel between the mobile device and a first server;
    determining that the application is no longer active while the mobile device is connected to the wireless network that is insecure; and
    in response to a determination that the application is no longer active, disconnecting the secure communication channel between the mobile device and the first server.

2. The method of claim 1, wherein the secure communication channel is a virtual private network (VPN) connection.

3. The method of claim 1, wherein the determining that the application no longer active comprises:
    detecting, during the monitoring for activation of the application, that a current display interface of the mobile device is not displaying an interface of the application;
    wherein the secure communication channel is disconnected in response to the detection that the current display interface is not displaying the interface of the application.

4. The method of claim 3, further comprising:
    displaying, during the monitoring of the application, content indicating that the client is monitoring in the current display interface; and
    cancelling the displaying of the content when the mobile device disconnects from the secure communication channel.

5. The method of claim 1, further comprising:
    detecting that the client has exited from a display interface of the mobile device during the monitoring of the application; and
    in response to detecting that the client has exited from the display interface, displaying, in the display interface, content to indicate that the application is being monitored by the client.

6. The method of claim 1, further comprising:
    determining that the mobile device is disconnected from the wireless network;
    determining that the application is being monitored for a first time; and
    displaying content in a current display to indicate that the monitoring of the application has ended.

7. The method of claim 1, further comprising:
    determining that the mobile device is disconnected from the wireless network;
    determining that the application is being monitored for at least a second time;
    determining that the client has performed one or more security measures for one or more pre-configured operations of the application;
    signaling in a current display interface that the client has performed one or more security measures for the one or more pre-configured operations of the application; and
    displaying content in the current display interface to indicate one or more security measures performed by the client until a current time point.

8. The method of claim 1, further comprising:
    obtaining a website Uniform Resource Locator (URL) that is to be accessed by the application;

comparing the website URL with a pre-configured list of URLs, wherein the pre-configured list of URLs records phishing website URLs; and blocking, when the website URL matches a URL of the pre-configured list of URLs, the mobile device from connecting to the website URL.

9. The method of claim 1, further comprising:

obtaining a website Uniform Resource Locator (URL) that is to be accessed by the application;

transmitting the website URL to the first server to be compared with a pre-configured list of phishing website URLs and generate a comparison result;

receiving the comparison result from the first server; and in response to the comparison result indicating that the website URL matches a website URL in the pre-configured list of URLs, blocking the mobile device from connecting to the website URL.

10. A wireless security system, comprising:

one or more processors configured to:

acquire, by a client running on a mobile device, a type of a wireless network to which the mobile device is connected;

determine, by the client, that the type of the wireless network corresponds to a network that is insecure based at least in part on a frequency with which the mobile device connects to the wireless network;

in response to a determination that the type of the wireless network is insecure, invoke, by the client, a secure mode in which the client is to operate while the mobile device is connected to the wireless network that is insecure; and in response to the secure mode being invoked, monitor for activation of an application, the application being installed on the mobile device;

determine that the application is to be activated while the mobile device is connected to the wireless network that is insecure;

in response to a determination that the application is to be activated while the mobile device is connected to the wireless network that is insecure, establish a secure communication channel between the mobile device and a first server;

determine that the application is no longer active while the mobile device is connected to the wireless network that is insecure; and in response to a determination that the application is no longer active, disconnect the secure communication channel between the mobile device and the first server; and one or more memories coupled to the one or more processors and configured to provide the one or more processors with instructions.

11. The system of claim 10, further comprising a second server configured to process messages forwarded by the first server, wherein the messages are generated and transmitted to the first server using the secure communication channel by the mobile device.

12. The system of claim 10, wherein the secure communication channel is a virtual private network (VPN) connection.

13. The system of claim 10, wherein to determine that the application no longer active comprises:

detect, during the monitoring for activation of the application, that a current display interface of the mobile device is not displaying an interface of the application;

wherein the secure communication channel is disconnected in response to the detection that the current display interface is not displaying the interface of the application.

14. The system of claim 13, wherein the one or more processors are further configured to:

display, during the monitoring of the application, content indicating that the system is monitoring in the current display interface; and cancel the displaying of the content when the mobile device disconnects from the secure communication channel.

15. The system of claim 10, wherein the one or more processors are further configured to:

detect that the system has exited from a display interface of the mobile device during the monitoring of the application; and in response to detecting that the system has exited from the display interface, display, in the display interface, content to indicate that the application is being monitored by the system.

16. The system of claim 10, wherein the one or more processors are further configured to:

determine that the mobile device is disconnected from the wireless network;

determine whether the application is being monitored for a first time;

in response to the determination that the application is being monitored for the first time, display content in a current display to indicate that the monitoring of the application has ended;

in response to a determination that the application is being monitored for at least a second time, determine that the system has performed one or more security measures for one or more pre-configured operations of the application;

signal in the current display that the system has performed the one or more security measures for the one or more pre-configured operations of the application; and display content in the current display to indicate the one or more security measures performed by the system until a current time point.

17. The system of claim 10, wherein the one or more processors are further configured to:

obtain a website Uniform Resource Locator (URL) that is to be accessed by the application;

compare the website URL with a pre-configured list of URLs, wherein the pre-configured list of URLs records phishing website URLs; and block, when the website URL matches a URL of the pre-configured list of URLs, the mobile device from connecting to the website URL.

18. The system of claim 10, wherein the one or more processors are further configured to:

obtain a website Uniform Resource Locator (URL) that is to be accessed by the application;

transmit the website URL to the first server to be compared with a pre-configured list of phishing website URLs and generate a comparison result;

receive the comparison result from the first server; and in response to the comparison result indicating that the website URL matches a website URL in the pre-configured list of URLs, blocking the mobile device from connecting to the website URL.

19. A computer program product for network attack defense, the computer program product being embodied in a non-transitory tangible computer readable storage medium and comprising computer instructions for:

acquiring, by a client running on a mobile device, a type of a wireless network to which the mobile device is connected;

determining, by the client, that the type of the wireless network corresponds to a network that is insecure based at least in part on a frequency with which the mobile device connects to the wireless network;

in response to a determination that the type of the wireless network is insecure, invoking, by the client, a secure mode in which the client is to operate while the mobile device is connected to the wireless network that is insecure; and in response to the secure mode being invoked, monitoring for activation of an application, the application being installed on the mobile device;

determining that the application is to be activated while the mobile device is connected to the wireless network that is insecure;

in response to a determination that the application is to be activated while the mobile device is connected to the wireless network that is insecure, establishing a secure communication channel between the mobile device and a first server;

determining that the application is no longer active while the mobile device is connected to the wireless network that is insecure; and in response to a determination that the application is no longer active, disconnecting the secure communication channel between the mobile device and the first server.

20. The method of claim 1, wherein the determining that the application is to be activated comprises:

querying a list of active processes on the client; and determining whether a process corresponding to the application is a foreground process of the client.

21. The method of claim 1, further comprising:

in response to establishing the secure communication channel between the mobile device and the first server, communicating information associated the application via the secure communication channel, wherein other information associated with one or more other apps communicate with one or more other servers via the wireless network without using the secure communication channel.

22. The method of claim 1, wherein a determination that the type of the wireless network corresponds to the network that is insecure is further based on a determination that the wireless network is a public network.

23. The method of claim 1, wherein the monitoring for activation of the application comprises querying an operating system of the mobile device for an indication of whether an interface for the application is visible on the mobile device.

* * * * *

UNITED STATES PATENT AND TRADEMARK OFFICE
CERTIFICATE OF CORRECTION

PATENT NO. : 10,951,587 B2
APPLICATION NO. : 15/676811
DATED : March 16, 2021
INVENTOR(S) : Guo et al.

Page 1 of 1

It is certified that error appears in the above-identified patent and that said Letters Patent is hereby corrected as shown below:

On the Title Page

Item (73), assignee, address, insert --(KY)--.

In the Claims

In Column 16, Line(s) 13, Claim 21, after "associated", insert --with--.

Signed and Sealed this
Thirtieth Day of November, 2021

Drew Hirshfeld
*Performing the Functions and Duties of the
Under Secretary of Commerce for Intellectual Property and
Director of the United States Patent and Trademark Office*